Feb. 14, 1967    W. J. McANESPEY    3,304,381
CAUTION LIGHT APPARATUS TO INDICATE VEHICLE DECELERATION
Filed Sept. 2, 1965    2 Sheets-Sheet 1

INVENTOR
WILLIAM J. McANESPEY
BY
*Busser Smith & Harding*
ATTORNEYS

Feb. 14, 1967 W. J. McANESPEY 3,304,381
CAUTION LIGHT APPARATUS TO INDICATE VEHICLE DECELERATION
Filed Sept. 2, 1965 2 Sheets-Sheet 2
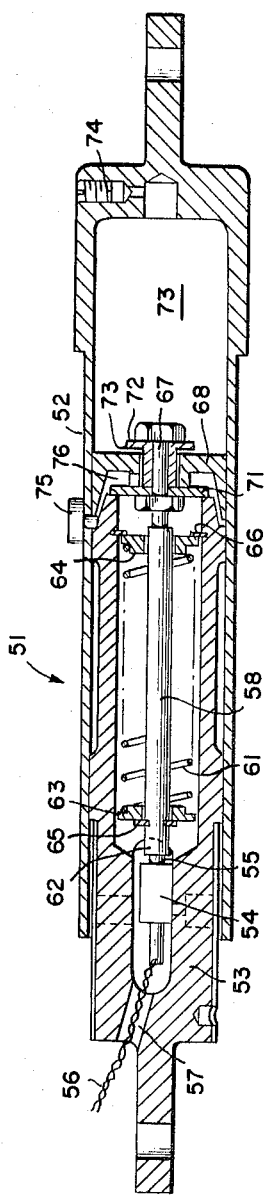
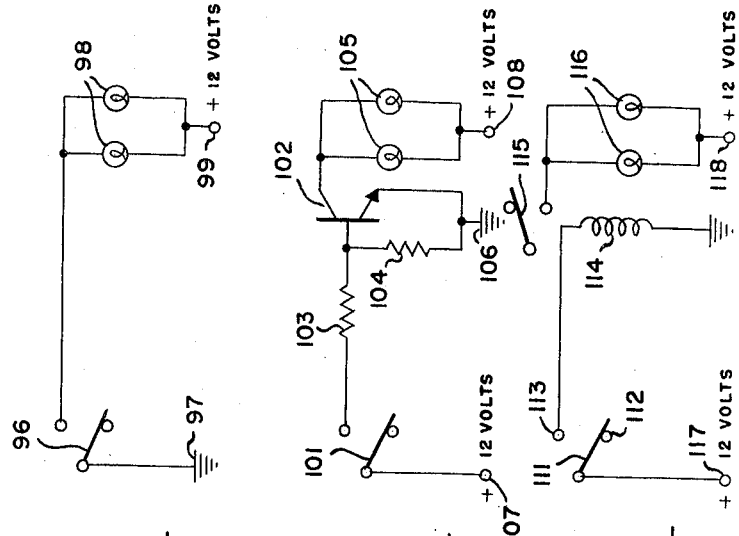
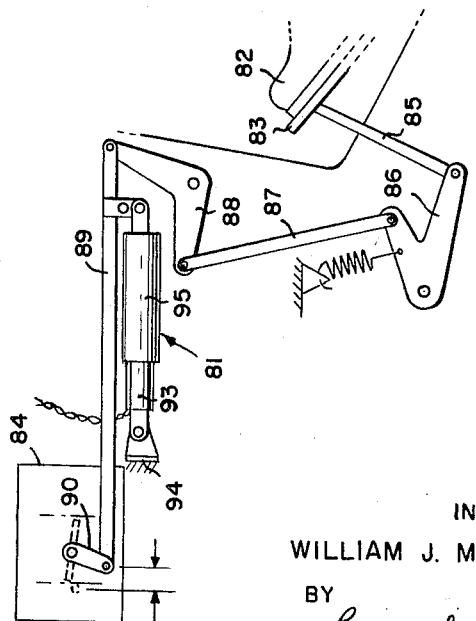
INVENTOR
WILLIAM J. McANESPEY
BY
Busser Smith & Harding
ATTORNEYS United States Patent Office 3,304,381
Patented Feb. 14, 1967

3,304,381
CAUTION LIGHT APPARATUS TO INDICATE
VEHICLE DECELERATION
William J. McAnespey, Philadelphia, Pa., assignor to
Triex, Inc., a corporation of Pennsylvania
Filed Sept. 2, 1965, Ser. No. 484,712
9 Claims. (Cl. 200—61.89)

This invention relates to caution light apparatus, and more particularly concerns improvements in actuators for a caution light apparatus for use in a vehicle to indicate that the vehicle is decelerating.

This invention is useful in the caution light apparatus disclosed in my copending patent application Ser. No. 433,380 which was filed on February 17, 1965.

It is an object of this invention to provide an improved actuator for actuating a caution light in the rear of a vehicle to warn following vehicles that the first vehicle is decelerating so that the driver of the following vehicle may adjust its speed accordingly.

It is another object to provide an actuator which is more highly sensitive so as to respond to small changes in vehicle speed.

It is another object of the invention to eliminate open contacts and the danger of sparks from open contacts igniting any material near the contact zone.

Other objects and advantages of this invention, including the ease with which it may be adapted to existing equipment, will further become apparent hereinafter and in the drawings, in which:

FIG. 4 is a view in section of another embodiment of the invention;

FIG. 5 is a schematic view which shows the actuator installed in a motor vehicle;

FIG. 6 is a diagrammatic view of an electrical circuit which may be used with the actuator;

FIG. 7 is a diagrammatic view of another electrical circuit which may be used with the actuator; and FIG. 8 is a diagrammatic view of another electrical circuit which may be used with the actuator.

Figure 1:
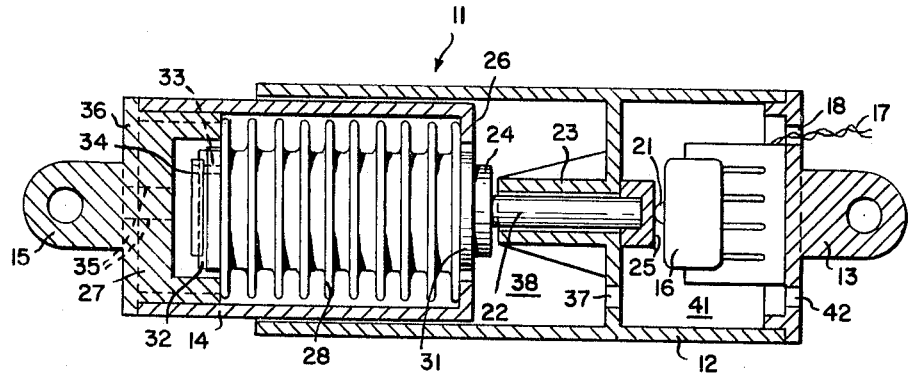
FIG. 1 is a view in section of an actuator constructed in accordance with this invention including an inner cylinder and an actuator switch in closed position.

Although specific terms are used in the following description for clarity, these terms are intended to refer only to the structure shown in the drawings and are not intended to define or limit the scope of the invention.

Figure 2:
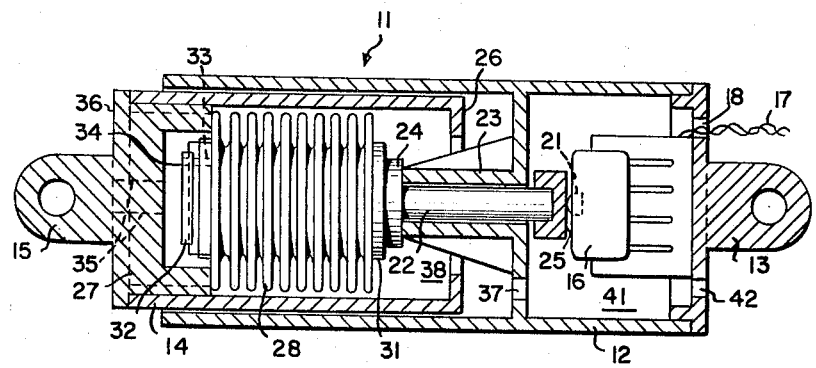
FIG. 2 is a view similar to FIG. 1 but shows the inner cylinder moved to the right and the actuator switch in open position.
Figure 3:
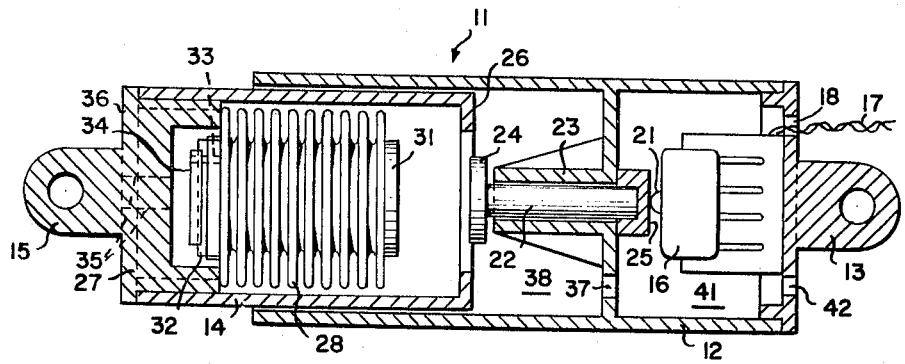
FIG. 3 is a view similar to FIGS. 1 and 2 but shows the inner cylinder moved to the left and the actuator switch again in closed position.

Turning now to the specific embodiment of the invention selected for illustration in the drawings, there is shown in FIGS. 1 to 3 a bellows type actuator 11 which includes a fixedly positioned outer cylinder 12 which may be attached to a support bracket by a clevis pin 13. An inner cylinder 14 is positioned within outer cylinder 12 and is axially movable relative thereto. A clevis pin 15 on inner cylinder 14 may be attached to throttle mechanism of an automotive vehicle by an adjustable link and be movable thereby.

An actuating switch 16 is mounted in one end of outer cylinder 12 and wires 17 extend therefrom to the exterior of cylinder 12 through port 18. A switch button 21 projects outwardly from switch 16 and is urged outwardly by a spring or other means. The switch is in closed position in FIG. 1 and a caution light in circuit with it is illuminated. When switch button 21 is pushed inwardly, the switch is in open position and any caution light in circuit with it is not illuminated.

To the left of actuating switch 16, an actuating rod 22 is mounted in a rod support 23 formed in outer cylinder 12. Rod 22 includes a rod head 24 and a pusher face 25 which contacts switch button 21.

Inner cylinder 14 has an open end which includes an inturned flange 26 and has a substantially closed end in which is positioned a cup-shaped support 27.

A bellows 28 is positioned in inner cylinder 14 between support 27 and inturned flange 26. End 31 of bellows 28 is adapted to contact head 24 of actuating rod 22 and to move the actuating rod toward actuating switch 16. End 31 is closed.

End 32 of bellows 28 is provided with a bleed hole 33 for admitting air to the bellows and is also provided with a check valve 34 for emitting air from the bellows.

Two filtered air vents 35 are formed in end 36 of inner cylinder 14 and in cup-shaped support 27. Air vent 37 is formed in rod support 23 to permit air to pass from chamber 38 of outer cylinder 12 to chamber 41. Air vent 42 provides for passage of air from chamber 41.

FIG. 4 discloses a piston type actuator 51 having an outer cylinder 52 and an inner cylinder 53. Inner cylinder 53 is adapted to be fixedly mounted under the hood of an automobile, and outer cylinder 52 is adapted to be attached to throttle mechanism of the automobile and to respond to its movement.

An actuating switch 54 is mounted in inner cylinder 53 and has a switch button 55 extending therefrom in the direction of outer cylinder 52. Button 55 is urged outwardly by a spring or other suitable means, and switch 54 is in its closed position when the button is in its outward position. When button 55 is depressed, then the switch 54 is in open condition and any caution light in circuit with the switch is not illuminated. When switch 54 is in closed condition, any caution light in circuit with it is illuminated.

Wires 56 extend from switch 54 through a port 57 formed in the base of cylinder 53 and may be attached to a suitable source of electric power and to a caution light.

An actuator rod 58 is positioned within inner cylinder 53 and has a spring 61 which pushes rod end 62 against switch button 55. Spring 61 is contained between spring retaining washers 63 and 64. A limit stop 65 mounted on rod 58 limits the movement of retaining washer 63 toward rod end 62. A limit stop 66 on the inner face of cylinder 53 limits the movement of retaining washer 64 toward head end 67 of rod 58.

A piston head 68 is mounted on head end 67 and is movable between a washer 71 and a piston retainer 72 having a soft rubber valve facing 73.

A chamber 73 is formed in outer cylinder 12 above piston head 68, and an adjustable needle valve 74 is adapted to admit air to chamber 73.

A throttle-closed stop member 75 is mounted on the wall of outer cylinder 12 to limit the motion of piston head 68.

FIG. 3 shows schematically a typical installation of an actuator 81 under the hood of an automotive vehicle. There is shown a foot 82 of a driver in contact with an accelerator pedal 83 which is connected to a carburetor 84 by links and cranks 85–90.

Inner cylinder 93 of actuator 81 is connected to a fixed support bracket 94 and outer cylinder 95 is connected to movable link 89 and moves therewith in response to movement of the accelerator pedal 83.

FIG. 6 shows an actuator switch 96 connected in an electrical circuit which runs from ground 97 through switch 96 and caution lights 98 to a terminal 99 which is connected to a source of power such as to the positive side of a 12 volt battery.

FIG. 7 illustrates an actuator switch 101 connected in a transistor circuit which includes a transistor 102, resistances 103 and 104, caution lights 105, terminal 106 connected to ground, and terminals 107 and 107 connected to a source of power such as the positive side of a 12 volt battery. The transistor 102 is energized when the 12 volts is applied to its base through resistor 103 when actuator switch 101 is closed. This illuminates the caution lights 105.

FIG. 8 discloses an actuator switch 111 in a relay circuit which minimizes the load current on the sensitive switch contacts 112 and 113. The circuit includes a relay winding 114 and armature 115 and caution lights 116, and terminals 117 and 118 which are connected to a suitable source of electric power such as the positive side of a 12 volt battery.

When switch 111 is closed, voltage is applied to coil 114 of a relay to close armature 115 and illuminate the caution lights 116.

Referring now to FIGS. 1–3, when installed in an automotive vehicle the bellows type actuator 11 has its clevis pin 15 attached to a fixed support and its clevis pin 13 attached to the throttle mechanism of the automotive vehicle by an adjustable link. The distance between clevis pins 15 and 13 is set by moving the adjustable link so that end 31 of bellows 28 is just touching actuator rod head 24. This is accomplished by moving the adjustable link until the caution light just goes out and then readjusting until the caution light goes on. This operation calibrates the actuator 11 and compensates for any variations in the dimensions of switches 16 or bellows 28.

In operation of the bellows type actuator 11 shown in FIGS. 1–3, when the accelerator pedal is depressed, inner cylinder 14 moves into outer cylinder 12 as is shown in FIG. 2 and the bellows 28 pushes actuating rod 22 toward the switch until rod head 24 is tight against the end of rod support 23. This movement of actuating rod 22 moves pusher face 25 against switch button 21 to depress the button and open the switch 16 to turn off any caution lights connected in circuit with the switch. As long as the accelerated pedal remains in depressed position or is further depressed, the caution lights will not go on.

Any air that was trapped in chamber 38 escapes through air vents 37 and 42 when inner cylinder 14 moves axially towards the outer cylinder 12. Any air trapped inside bellows 28 escapes through check valve 34 and filtered vents 35.

When the foot pressure on the accelerator is decreased, inner cylinder 14 moves out of outer cylinder 12 as shown in FIG. 3. The relative position of belows 28 and inner cylinder 14 remains the same as that shown in FIG. 2, but since end 31 has moved away from rod head 24, the pressure of pusher face 25 has been removed from switch button 21 and the switch is closed, causing the caution lights to become illuminated.

Air now starts to enter bellows 28 through bleed hole 33 and the bellows starts to expand. After an interval of time, determined by the adjustment of bleed hole 33, bellows 28 reaches its normal length and presses against rod head 24 to again depress the button 21 on switch 16 and cause the caution lights to go off.

When all pressure is removed from the gas pedal, and the throttle is therefore closed, inner cylinder 14 and bellows 28 return to the position illustrated in FIG. 1 and the caution lights stay on until the accelerator pedal is pressed or the ignition turned off.

It is to be noted that in operation the caution light will remain on for a period of time which is proportional to the amount of deceleration. When the pressure is completely removed from the gas pedal, the caution lights remain on until the pedal is again depressed or the ignition is turned off.

The small force required to operate the actuator is obtained from the downward stroke of the gas pedal.

In operation of the embodiment of the invention illustrated in FIG. 4, with the ignition switch of the automotive vehicle turned on and with the driver's foot off the accelerator pedal, switch 54 is in closed position and the caution lights are illuminated. When the accelerator pedal is depressed to open the throttle, actuator rod 58 engages switch button 55 to open the switch 54 and to turn off the warning lights. When the accelerator pedal is released, outer cylinder 52 moves toward the right, since inner cylinder 53 is fixed in position, and creates a partial vacuum in chamber 73. This causes a differential pressure on piston head 68 which causes it to move to the right and immediately press against the soft rubber valve facing 73 thus effectively sealing chamber 73 from the atmospheric pressure in chamber 76. Piston 68 continues to move to the right thereby compressing spring 61 between the spring retaining washers 63 and 64. The instant that piston head 68 moves to the right, actuator rod 58 moves away from button 55 of switch 54 and closes the switch to illuminate the caution lights.

The piston 68 keeps moving to the right until the force on the piston due to the differential pressure is equal to the force exerted by the spring 61. In the meantime, air is entering vacuum chamber 73 through needle valve 74 at a rate determined by adjustment of the needle valve. As air flows into champer 73, spring 61 gradually expands and causes the piston 68 to move to the left until it finally reaches its final position as shown in FIG. 4. Switch 54 is again contacted by actuator rod 58 to open the switch and to deenergize the caution lights which are connected to the switch through wires 56.

The time delay of the system, i.e. the time that the caution lights are on, is determined by the setting of needle valve 74 and by the total amount of travel of outer cylinder 52. This is important because it means the larger the deceleration, the longer time the caution lights are on. For example, if the throttle is open full and it is suddenly closed by removing foot pressure from the accelerator pedal, the outer cylinder 52 moves a maximum distance to the right and the volume of chamber 73 is at a maximum. Since the needle valve 74 is leaking air into chamber 73 at a constant rate, it requires a maximum time period for the pressure to build up within chamber 73 so that the piston head 68 returns to its normal position to de-energize the caution lights. This is a great operational advantage, since the length of time the caution light is on is proportional to the magnitude of the deceleration called for which is in turn proportional to the danger of a rear end collision.

If the driver of the automotive vehicle suddenly wishes to accelerate, outer cylinder 52 moves to the left and a check valve action occurs between piston head 68 and the soft rubber valve facing 9 which prevents the pressure from building up in chamber 73. Switch button 55 of switch button 54 is depressed to open the switch and turn off the caution lights practically immediately.

Since the spring forces of the actuator are weak compared to the throttle spring forces, the actuator never prevents throttle closure. Moreover, the spring forces of the actuator are independent of throttle position since the piston position for steady throttle operation is always as shown in FIGS. 1 and 4 regardless of the position of the throttle. Thus any deceleration or throttle closure, from any speed whether it be 10 miles per hour or 80 miles per hour, encounters the same spring forces from the actuator.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently

The invention claimed is:

1. An actuator for caution light apparatus for use in a vehicle to indicate that the vehicle is decelerating and adapted to be operatively connected to an accelerator pedal, comprising inner and outer cylinders which are axially movable relative to each other,
a switch positioned in one of the cylinders,
an actuating rod,
switch-opening means normally urging the actuating rod against the switch to hold it open, means for moving the cylinders axially away from each other in response to letting up on the accelerator pedal,
and switch-closing means for moving the actuating rod away from the switch so that the switch closes in response to moving the cylinders axially away from each other.

2. An actuator for caution light apparatus for use in a vehicle to indicate that the vehicle is decelerating, comprising inner and outer cylinders which are axially movable relative to each other, a switch positioned in one of the cylinders, an actuating rod, switch-opening means normally urging the actuating rod against the switch to hold it open, and switch-closing means for moving the actuating rod away from the switch so that the switch closes in response to moving the cylinders axially away from each other, said switch-opening means including a bellows positioned in the other of the cylinders.

3. An actuator for caution light apparatus for use in a vehicle to indicate that the vehicle is decelerating, comprising inner and outer cylinders which are axially movable relative to each other, a switch positioned in one of the cylinders, an actuating rod, switch-opening means normally urging the actuating rod against the switch to hold it open, and switch-closing means for moving the actuating rod away from the switch so that the switch closes in response to moving the cylinders axially away from each other, said switch-opening means including a bellows positioned in the other of the cylinders, said switch-closing means including a switch button that closes the switch when the pressure of the actuating rod is removed when the cylinders are moved axially away from each other since the bellows does not expand immediately.

4. The actuator as in claim 1, wherein the switch-opening means includes a spring.

5. An actuator for caution light apparatus for use in a vehicle to indicate that the vehicle is decelerating, comprising inner and outer cylinders which are axially movable relative to each other, a switch positioned in one of the cylinders, an actuating rod, switch-opening means normally urging the actuating rod against the switch to hold it open, and switch-closing means for moving the actuating rod away from the switch so that the switch closes in response to moving the cylinders axially away from each other, said switch-opening means including a spring, said switch-closing means including a piston head on the end of the actuating rod which moves the rod away from the switch in response to a vacuum formed above the piston head when the cylinders are moved axially away from each other.

6. An actuator for caution light apparatus for use in a vehicle to indicate that the vehicle is decelerating and adapted to be operatively connected to an accelerator pedal, comprising inner and outer cylinders which are axially movable relative to each other, a switch positioned in one of the cylinders, an actuating rod, switch-opening means normally urging the actuating rod against the switch to hold it open, and switch-closing means for moving the actuating rod away from the switch so that the switch closes in response to moving the cylinders axially away from each other, said switch-opening means including a spring, said switch-opening means also including a piston head on the end of the actuating rod which moves the rod towards the switch in response to pressure formed above the piston head when the cylinders are moved axially toward each other.

7. An actuator for caution light apparatus for use in a vehicle to indicate that the vehicle is decelerating, said actuator being adapted to be operatively connected to an accelerator pedal, comprising a cylinder, a switch positioned in the cylinder, an actuating rod, switch-opening means for moving the actuating rod to open the switch in response to depressing the accelerator pedal, and switch-closing means for moving the actuating rod to close the switch in response to letting up on the accelerator pedal.

8. The actuator defined in claim 7, wherein said switch is enclosed in a housing, and said cylinder is fixed in position.

9. The actuator defined in claim 7, including time delay means for preventing the actuator rod from immediately opening the switch when again depressing the accelerator switch.

References Cited by the Examiner
UNITED STATES PATENTS

| | | | |
|---|---|---|---|
| 2,442,971 | 6/1948 | Chessrown | 200—34 X |
| 2,452,762 | 11/1948 | Karow | 200—61.89 |
| 3,187,121 | 6/1965 | Mingrone | 200—34 |

BERNARD A. GILHEANY, *Primary Examiner.*

J. BAKER, *Assistant Examiner.*